(12) United States Patent
Heuver

(10) Patent No.: US 8,994,236 B2
(45) Date of Patent: Mar. 31, 2015

(54) ELECTROMAGNETICALLY ACTUATED AXIAL ONE-WAY CLUTCH

(71) Applicant: Ford Global Technologies, LLC, Dearborn, MI (US)

(72) Inventor: Bradley R. Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 110 days.

(21) Appl. No.: 13/779,830

(22) Filed: Feb. 28, 2013

(65) Prior Publication Data

US 2014/0238811 A1  Aug. 28, 2014

(51) Int. Cl.
*H02K 7/10* (2006.01)
*F16D 27/09* (2006.01)
*F16D 23/12* (2006.01)

(52) U.S. Cl.
CPC  *F16D 27/09* (2013.01); *H02K 7/10* (2013.01); *F16D 2023/123* (2013.01)
USPC ........................................................... 310/77

(58) Field of Classification Search
CPC ...................................................... F16D 41/185
USPC ............................ 192/84.92, 69.81; 188/82.9
See application file for complete search history.

(56) References Cited

U.S. PATENT DOCUMENTS

| 2,969,134 | A | * | 1/1961 | Wiedmann et al. | ......... 192/84.92 |
| 3,603,437 | A | * | 9/1971 | Spencer | ..................... 192/69.81 |
| 5,030,181 | A | * | 7/1991 | Keller | ......................... 192/84.92 |
| 5,366,053 | A | * | 11/1994 | Yant | ........................... 192/219.2 |
| 8,006,819 | B2 | | 8/2011 | Dell et al. | |
| 2011/0290608 | A1 | | 12/2011 | Bird | |
| 2012/0165146 | A1 | | 6/2012 | Samie et al. | |
| 2014/0128220 | A1 | * | 5/2014 | Swales et al. | ................. 188/267 |

* cited by examiner

*Primary Examiner* — Rodney H Bonck
(74) *Attorney, Agent, or Firm* — James Dottavio; MacMillan, Sobanski & Todd, LLC

(57) ABSTRACT

A clutch including a rotatable member including a first ramp and first teeth, a second member held against rotation, axially displaceable, including a second ramp and second teeth, a spring urging the first and second members apart, and an electromagnet causing the first and second teeth to engage and prevent rotation in a first direction, rotation in a second direction separating the first and second members as the first ramp ascends the second ramp.

8 Claims, 5 Drawing Sheets

ELECTROMAGNETICALLY ACTUATED AXIAL ONE-WAY CLUTCH

BACKGROUND OF THE INVENTION

1. Field of the Invention

This invention relates generally to magnetically-actuated one-way clutch, and, more particularly to a motor-generator that employs a magnetically actuated one-way clutch especially for use in a hybrid electric vehicle.

2. Description of the Prior Art

The powertrain of a hybrid electric vehicle (HEV) includes an electric motor-generator. This generator is used to start the vehicle when in electric motor mode and when in generator mode the electric generator produces ac electric current, which is converted to dc and stored in an electric storage battery.

Under certain vehicle operating conditions, the motor is used to drive the vehicle wheels. In other operating conditions the electric generator produces ac electric current, which is converted to dc and stored in an electric storage battery.

The generator's rotor exhibits unwanted rotation in some modes of operation. The rotor must be stopped from rotating in some modes of operation and must be allowed to rotate in either direction in other modes of operation.

Hybrid transaxles can achieve improved fuel economy by having an electric generator brake for modes of operation where the generator is at zero speed.

A need exists in the industry for a simple, reliable, low-cost device for controlling generator rotation. Preferably the device would be a direct acting, electrically actuated one-way clutch with one sliding element having self-energization capability after it is actuated.

SUMMARY OF THE INVENTION

A clutch including a rotatable member including a first ramp and first teeth, a second member held against rotation, axially displaceable, including a second ramp and second teeth, a spring urging the first and second members apart, and an electromagnet causing the first and second teeth to engage and prevent rotation in a first direction, rotation in a second direction separating the first and second members as the first ramp ascends the second ramp.

The one-way clutch provides a simple, reliable, low-cost selectable technique for controlling rotation of the rotor of a motor-generator. The clutch can be used in multiple applications where a magnetic field can be turned on and off in order to control the presence and absence of a drive connection across the clutch.

The clutch avoids need for clutch linkages and an electric solenoid to control an actuator of the clutch, minimizes the number of parts, and has a small rotating mass.

The clutch includes a rotatable plate and a non-rotatable plate that can move axially with the rotatable plate. The non-rotatable plate is pulled into its engaged position by the electromagnet, and returned by a spring. The clutch locks in one rotary direction and overruns in the opposite direction.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
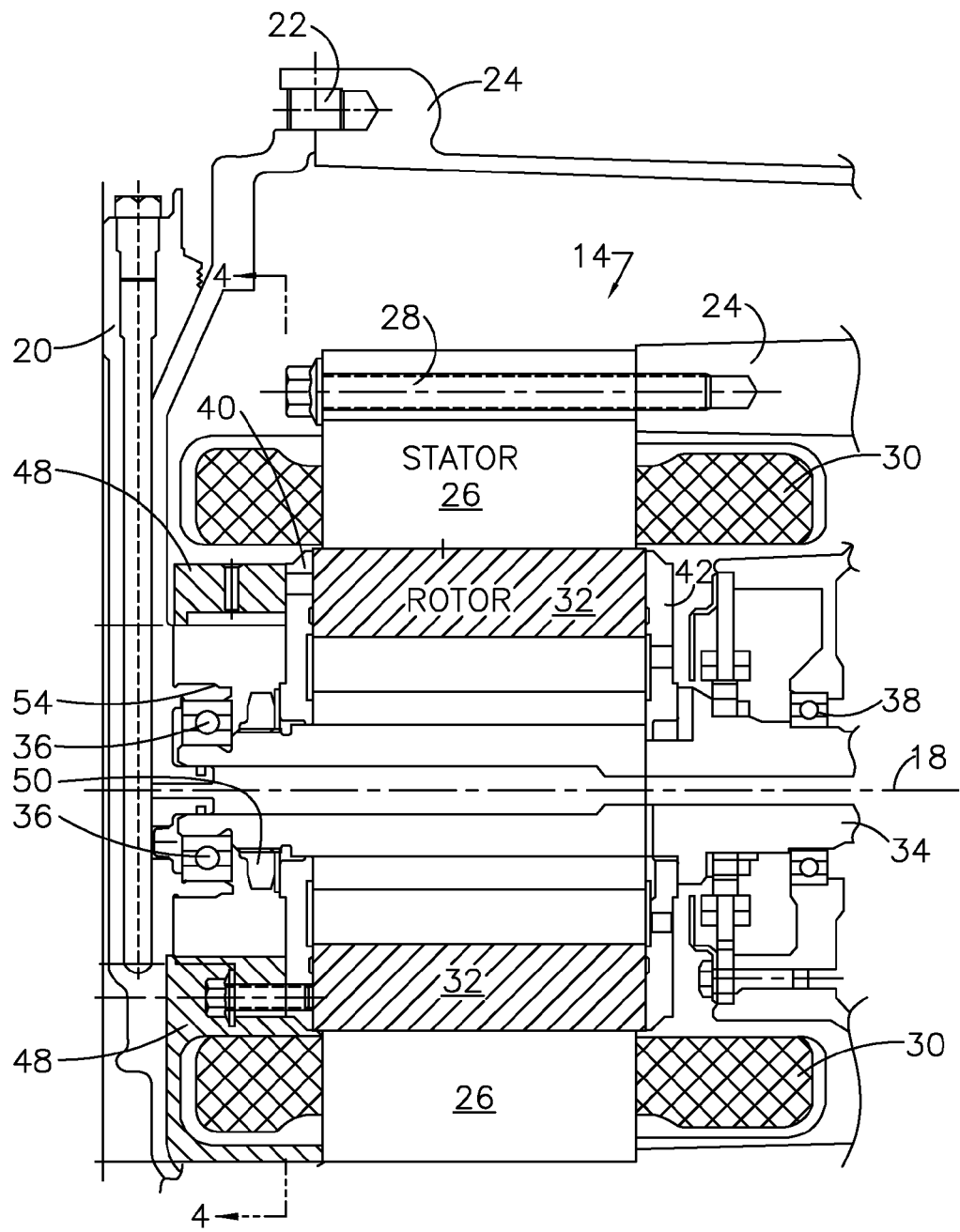
FIG. 1 is a cross section of a motor generator that includes a one-way clutch.

Referring now to the drawings, FIG. 1 shows a motor-generator 14 arranged about a central axis 18 and located within a space bounded by a front housing cover 20 secured by bolts 22 and to a housing 24, whose position is fixed.

The motor-generator 14 includes a stator 26, secured by a series of bolts 28 to an extension of the housing 24 or another fixed member; electrically conductive wire wound in a coil 30 about axis 18; a rotor 32 surrounded by the stator; and a rotor shaft 34 supported for rotation about axis 18 on bearings 36, 38. Each axial end of the rotor 32 is covered by an end cap 40, 42. A ring 48 contacts the end cap 40. A nut 50, engaged by a screw thread with rotor shaft 34, contacts ring 48.

Figure 2:
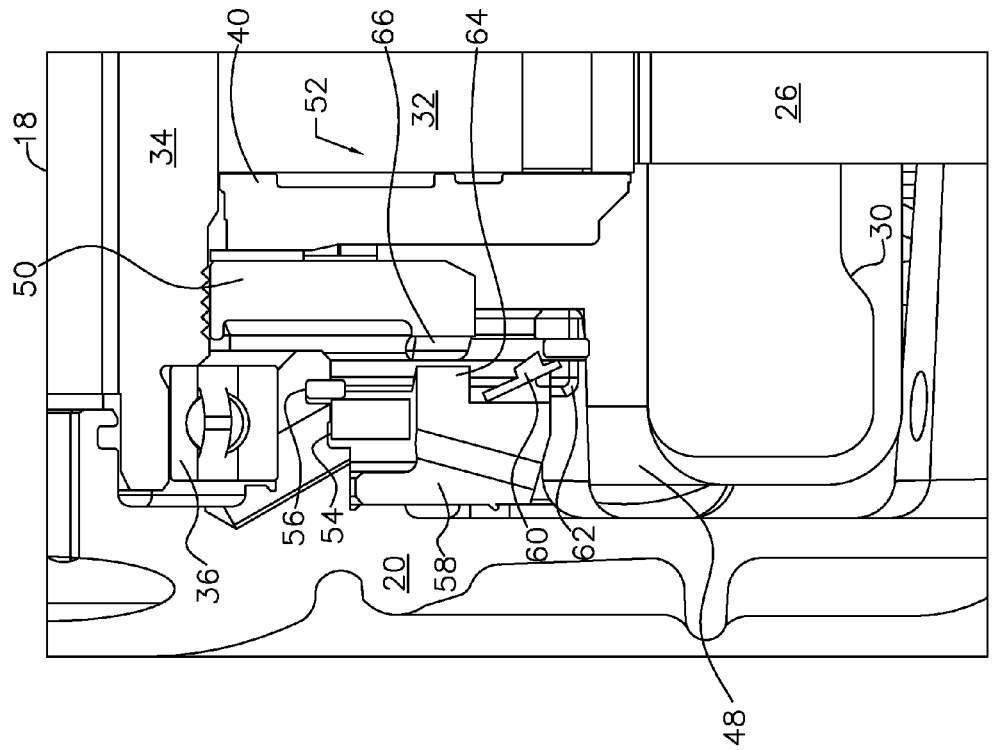
FIG. 2 is a cross section of the motor-generator of FIG. 1 showing the dog clutch member engaged with the nut.
Figure 3:
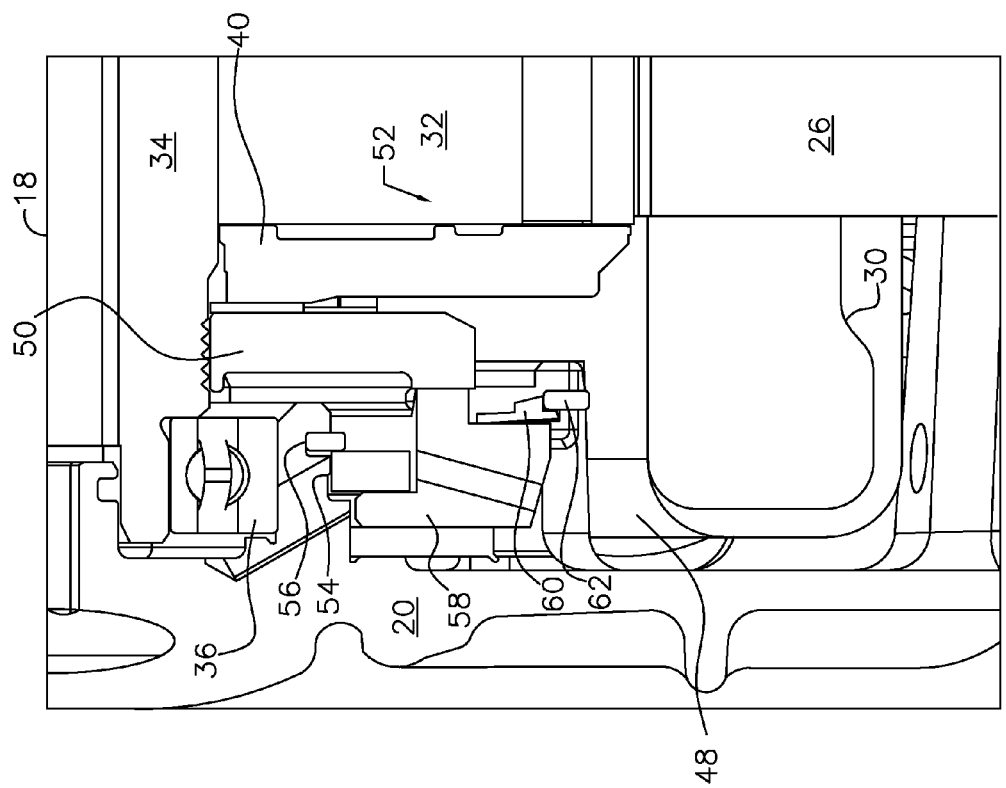
FIG. 3 is a cross section of the motor-generator of FIG. 1 showing the dog clutch member disengaged from the nut.

FIGS. 2 and 3 show a dog clutch 52 comprising nut 50 and a dog clutch member 58. The coil of an electric conductor, preferably copper wire, is encased in a electromagnet assembly 54 secured by a first snap ring 56 on cover 20 and located adjacent the dog clutch member 58. A Belleville spring 60, contacting dog clutch member 58 and a second snap ring 62, continually urges the dog clutch member 58 leftward away from nut 50.

Figure 5:
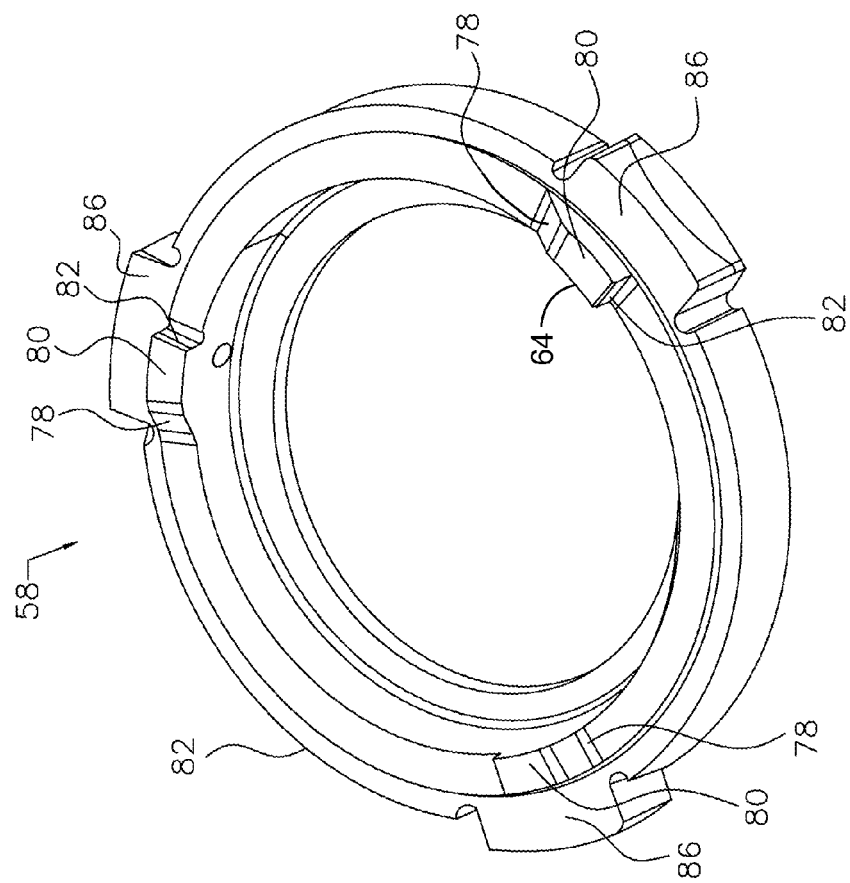
FIG. 5 is a perspective end view of the axial inner face of the clutch member.
Figure 4:
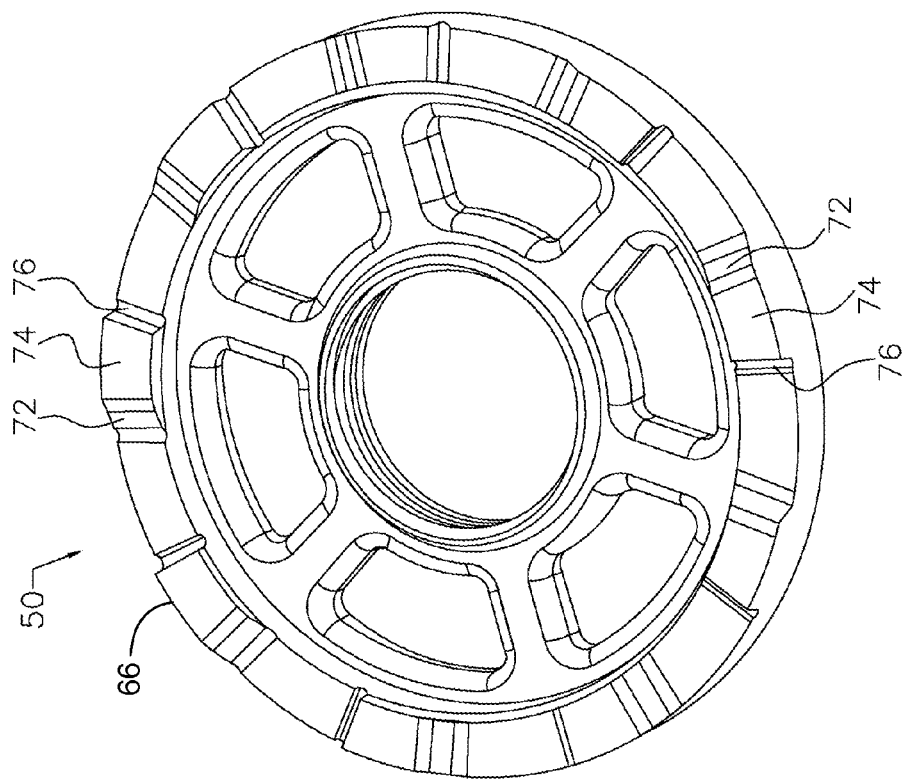
FIG. 4 is a perspective end view of the inner axial face of the nut.

FIGS. 3 and 5 show that dog clutch member 58 is formed with projection 64, spaced mutually and angularly about axis 18 and extending rightward axially away from the body of member 58 and toward the nut 50. FIGS. 3 and 4 show that nut 50 is formed with projections 66, spaced mutually and angularly about axis 18 and extending leftward axially away from the body of nut 50 and toward the teeth 64 of member 58.

FIG. 4 shows that the axial inner face of nut 50 is formed with nine of the angularly spaced projections 66, each projection 66 being formed with an inclined ramp 72, an angular length portion 74 that may have a flat surface, and dog clutch tooth 76, located at the opposite end of the length portion 74 from the location of the ramp 72.

Similarly, FIG. 5 shows that the axial inner face of dog clutch member 58 is formed with three of the angularly spaced projections 64, each projection being formed with an inclined ramp 78, an angular length portion 80 that may have a flat surface, and a dog clutch tooth 82, located at the opposite end of the length portion 80 from the location of the ramp 78. The dog clutch member 58 is also formed with lugs 86, spaced angularly about axis 18 and extending radially outward from the axis.

The clutch member 58 is installed such that each of its projections 64 is located between first and second projections 66 of the nut 50, with the clutch tooth 82 of the clutch member projection 64 aligned with and facing the clutch tooth 76 of the first one of the clutch member projections 64, and with the ramp 86 of the clutch member projection 64 aligned with and facing the ramp 72 of the second one of the clutch member projections 64. When installed in this manner and position ramps 72 and 78 are substantially parallel surfaces, as shown in FIGS. 6 and 7.

Figure 6:
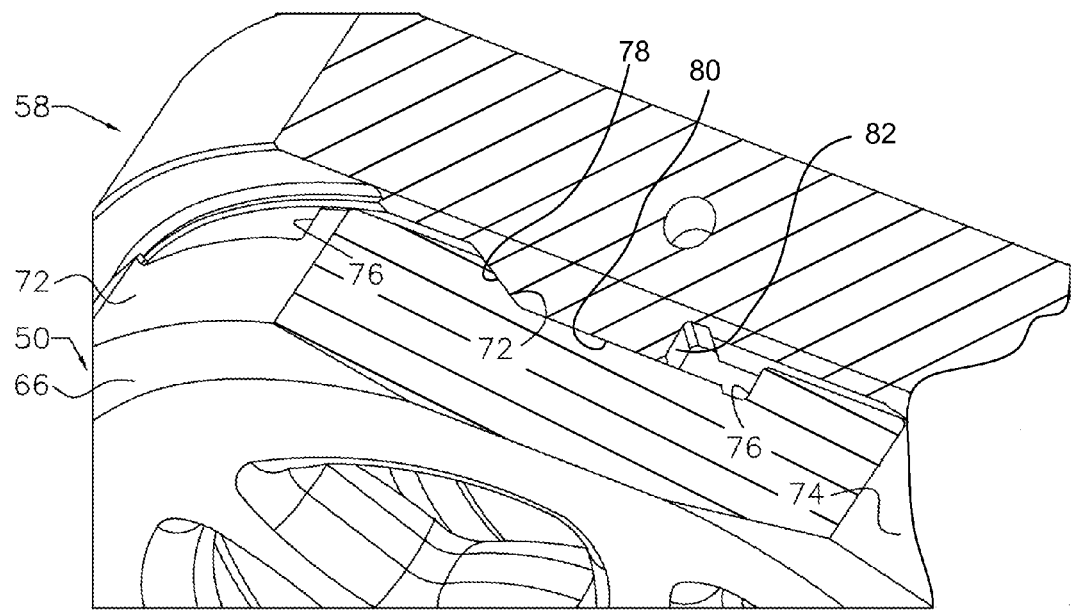
FIGS. 6 and 7 are perspective views showing a ramp of the dog clutch member contacting a ramp of the nut.
Figure 7:
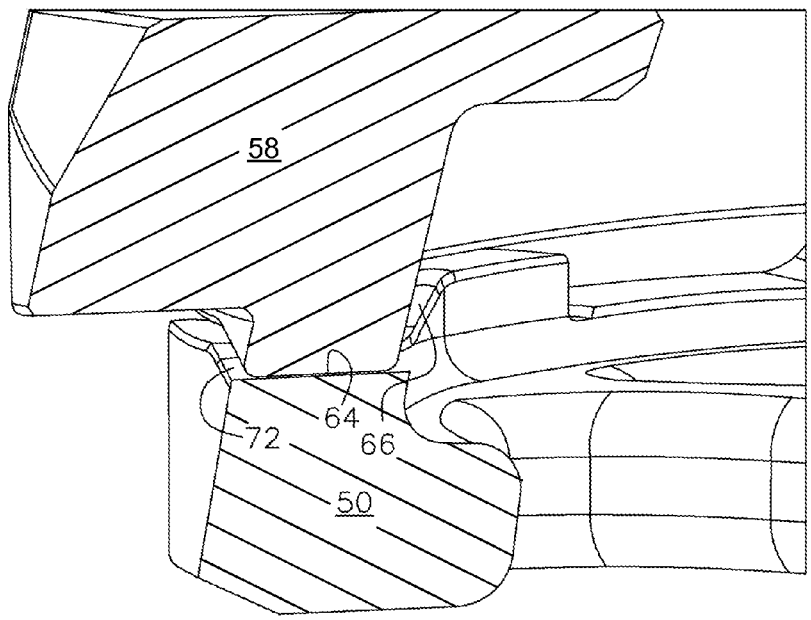

FIGS. 6 and 7 show a ramp 78 of dog clutch member 58 contacting a ramp 72 of nut 50, and clutch teeth 82 of clutch member 58 spaced from clutch teeth 76 of the nut 50.

Figure 8:
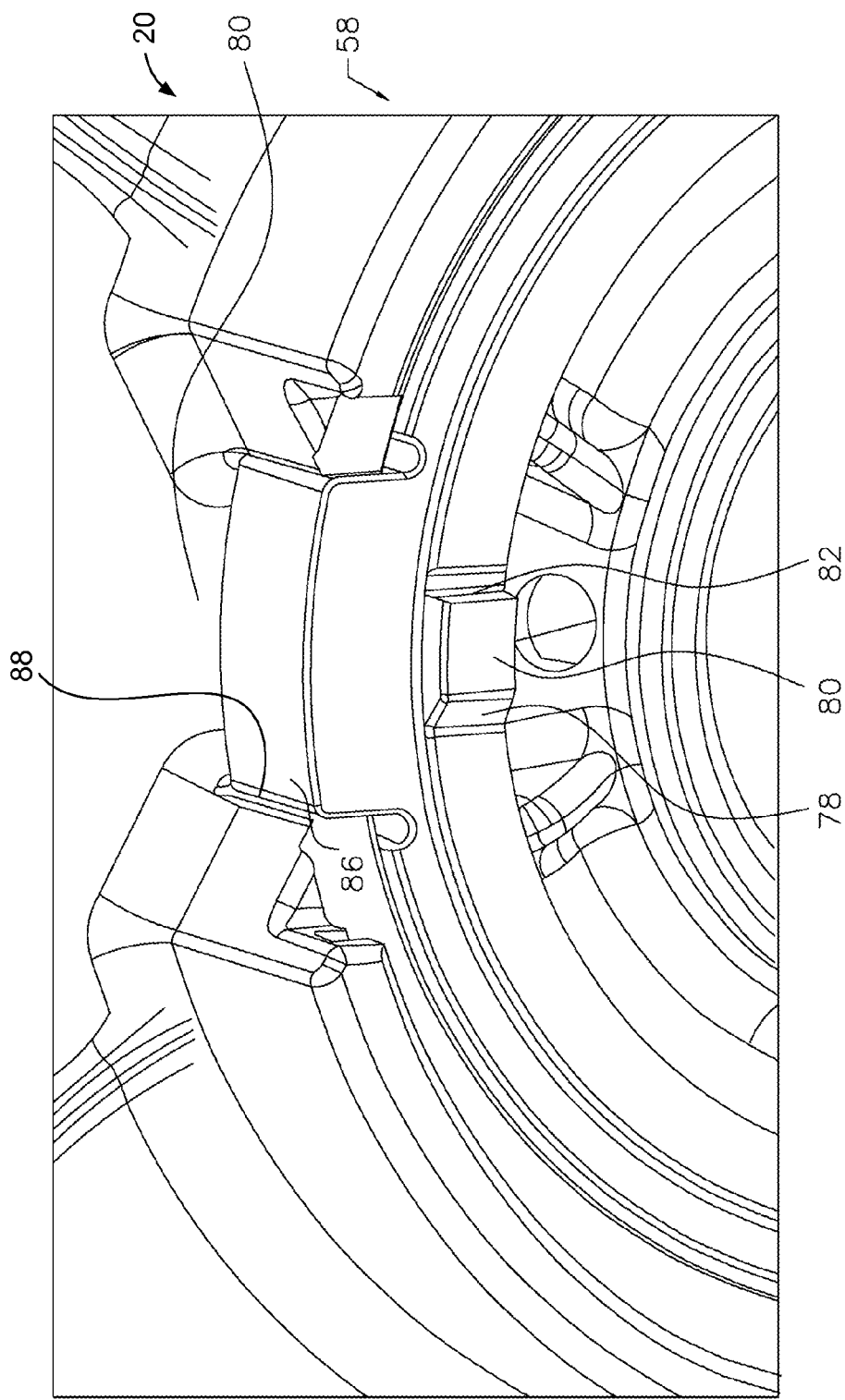
FIG. 8 is a perspective end view of the axial inner face of the clutch member showing the clutch member installed in the end cover.

FIG. 8 is an end view of the axial inner face of the dog clutch member 58 showing the clutch member installed in the end cover 20. Each lug 86 of member 58 is fitted in a recess 88 formed in the end cover 20, thereby preventing rotational displacement of member 58 relative to the cover 20 and nut 50, but permitting axial translation of member 58 relative to the cover and nut.

In operation, when the coil of electromagnet 54 is energized, dog clutch member 58 translates rightward, when viewed as in FIGS. 2 and 3, toward nut 50 due to the effect of the magnet field produced by the electromagnet. When rotor shaft 34 and nut 50 rotate counterclockwise about axis 18 when viewed as in FIG. 8, the clutch tooth 76 of at least one of the projections 66 of the nut contacts a corresponding clutch tooth of one of the projections 64 of the clutch member 58, thereby preventing rotation of the rotor shaft and nut.

When the coil of electromagnet 54 is deenergized, spring 60 urges dog clutch member 58 leftward, when viewed as in FIGS. 2 and 3, away from nut 50. When rotor shaft 34 and nut 50 rotate clockwise about axis 18 when viewed as in FIG. 8, the ramp 72 of at least one of the projections 66 of the nut ascends the ramp 78 of one of the projections 64 of the clutch member 58, thereby forcing the clutch member leftward, disengaging the nut from the clutch member, and allowing rotation of the rotor shaft and nut.

Leftward axial translation of the dog clutch member 58 is limited by its contact with the end cover 20, as FIG. 2 shows. Rightward axial translation of the dog clutch member 58 is limited by its contact with nut 50, whose axial position is fixed.

In accordance with the provisions of the patent statutes, the preferred embodiment has been described. However, it should be noted that the alternate embodiments can be practiced otherwise than as specifically illustrated and described.

The invention claimed is:

1. A clutch assembly, comprising:
a motor having a fixed stator and a rotor rotationally fixed on a rotatable rotor shaft;
a nut rotationally fixed to the rotor shaft and including at least one first projection having a first ramp and a first tooth;
a rotationally fixed, axially displaceable clutch member including at least one second projection having a second ramp and a second tooth;
a rotationally fixed spring urging the nut axially away from the clutch member;
a rotationally fixed electromagnet mounted between the nut and the clutch member and activatable to cause the first and second teeth to engage and prevent rotation of the rotor in a first direction, but allow rotation of the rotor in a second direction by separating the nut and clutch member as the first ramp ascends the second ramp.

2. The clutch assembly of claim 1, wherein:
energizing the electromagnet produces a magnetic field that causes the first and second teeth to engage in opposition to the spring and to prevent rotation in the first direction; and
deenergizing the electromagnet eliminates the magnetic field.

3. The clutch assembly of claim 1, wherein the at least one first projection of the nut comprises:
a plurality of the first projections spaced mutually about an axis, each first projection including a respective clutch tooth, a respective ramp and a respective length portion extending angularly between the clutch tooth and the ramp.

4. The clutch assembly of claim 1, wherein the at least one second projection of the clutch member comprises:
a plurality of the second projections spaced mutually about an axis, each second projection including a respective second clutch tooth, a respective second ramp and a respective second length portion extending angularly between the second clutch tooth and the second ramp.

5. The clutch assembly of claim 1, further comprising:
a cover fixed against movement relative to the stator and including recesses;
the clutch member including radially outwardly extending lugs spaced mutually and angularly, each lug located in one of the recesses, thereby preventing rotational displacement of the clutch member and permitting axial translation of the clutch member.

6. The clutch assembly of claim 1, wherein:
the at least one first projection of the nut further includes a plurality of first projections spaced mutually about an axis, each first projection including a respective first tooth, a respective first ramp and a respective length portion extending angularly between the clutch tooth and the ramp; and
the at least one second projection of the clutch member further includes a plurality of second projections spaced mutually about the axis, each second projection including a respective second tooth, a respective second ramp and a respective second length portion extending angularly between said one of the second teeth and said one of the second ramp.

7. The clutch assembly of claim 6, wherein:
each of the second projections is located between two of the first projections;
one of the second teeth of the second projection is aligned with and facing one of the first teeth; and
the second ramp of the second projection is aligned with and facing the first ramp.

8. The clutch assembly of claim 1, wherein the first ramp and the second ramp include substantially parallel surfaces.

* * * * *